United States Patent [19]

Subbarao

[11] Patent Number: 5,231,443
[45] Date of Patent: Jul. 27, 1993

[54] AUTOMATIC RANGING AND AUTOMATIC FOCUSING

[75] Inventor: Muralidhara Subbarao, Port Jefferson Station, N.Y.

[73] Assignee: The Research Foundation of State University of New York, Albany, N.Y.

[21] Appl. No.: 807,983

[22] Filed: Dec. 16, 1991

[51] Int. Cl.⁵ ............................................. G03B 13/36
[52] U.S. Cl. .................................... 354/400; 358/227
[58] Field of Search ............... 354/400, 402, 406, 407, 354/408; 358/227

[56] References Cited

U.S. PATENT DOCUMENTS

| | | |
|---|---|---|
| 4,141,032 | 2/1979 | Haeusler . |
| 4,404,594 | 9/1983 | Hannan . |
| 4,410,804 | 10/1983 | Stauffer . |
| 4,561,749 | 12/1985 | Utagawa ............................ 354/406 |
| 4,573,191 | 2/1986 | Kikode et al. . |
| 4,584,704 | 4/1986 | Ferren . |
| 4,601,053 | 7/1986 | Grumet . |
| 4,634,278 | 1/1987 | Ross et al. . |
| 4,636,624 | 1/1987 | Ishida et al. . |
| 4,640,620 | 2/1987 | Schmidt . |
| 4,661,986 | 4/1987 | Adelson . |
| 4,723,139 | 2/1988 | Ogasawara . |
| 4,728,980 | 3/1988 | Nakamura et al. . |
| 4,792,694 | 12/1988 | Shioya et al. . |
| 4,812,636 | 3/1989 | Kusaka et al. ...................... 354/408 |
| 4,814,889 | 3/1989 | Covey . |
| 4,965,840 | 10/1990 | Subbarao . |
| 4,990,947 | 2/1991 | Kimoya et al. ..................... 354/402 |
| 5,070,353 | 12/1991 | Komiya et al. ..................... 354/402 |
| 5,148,209 | 9/1992 | Subbaro ............................. 354/400 |

FOREIGN PATENT DOCUMENTS 62-284314 12/1987 Japan .
63-127217 5/1988 Japan .

OTHER PUBLICATIONS

"On the Depth Information in the Point Spread Function of a Defocused Optical System", by M. Subbarao, Technical Report No. 90.02.07 Computer Vision, Laboratory Dept. of Electrical Engineering, State University of New York at Stony Brook, Feb. 7, 1990.
"Determining Distance From Defocused Images of Simple Objects", by M. Subbarao, Technical Report No. 89.07.20, Computer Vision Laboratory Dept. of Electrical Engineering State University of New York at Stony Brook, Jul. 20, 1989.

(List continued on next page.)

*Primary Examiner*—Russell E. Adams
*Attorney, Agent, or Firm*—Hoffmann & Baron

[57] ABSTRACT

A method based on image defocus information is disclosed for determining distance (or ranging) of objects from a camera system and autofocusing of camera systems. The method uses signal processing techniques. The present invention includes a camera characterized by a set of four camera parameters: position of the image detector inside the camera, focal length of the optical system in the camera, the size of the aperture of the camera, and the characteristics of the light filter in the camera. In the method of the present invention, at least two images of the object are recorded with different values for the set of camera parameters. The two images are converted to one-dimensional signals by summing them along a particular direction whereby the effect of noise is reduced and the amount of computations are significantly reduced. Fourier coefficients of the one-dimensional signals and a log-by-rho-squared transform are used to obtain a calculated table. A stored table is calculated using the log-by-rho-squared transform and the Modulation Transfer Function of the camera system. Based on the calculated table and the stored table, the distance of the desired object is determined. In autofocusing, the calculated table and the stored table are used to calculate a set of focus camera parameters. The camera system is then set to the focus camera parameters to accomplish autofocusing.

32 Claims, 8 Drawing Sheets

OTHER PUBLICATIONS

"Image Filtering and Restoration", by A. Jain, Fundamentals of Digital Image Processing, pp. 267-331. 1989.

"Smoothed Differentiation Filters For Images" by P. Meer and I. Weiss, Smoothed Differentiation Filters For Images, Feb. 1989.

"The Three-Dimensional Light Distribution Near Focus", by M. Burn and E. Wolf, Principles of Optics, pp. 435-449, 1987.

"Focusing", by E. Krotkov, International Journal of Computer Vision, vol. 1, No. 3 pp. 223-238, 1987.

"A new Sense For Depth of Field", by A. Pentland, IEEE Transactions on Pattern Analysis and Machine Intelligence, vol. PAMI-9, No. 4, 523-531, Jul. 1987.

"Depth From Focus", by P. Grossmann, Pattern Recognition Letters, vol. 5, pp. 63-69, Jan. 1987.

"Convolution Singularities, Systems", by A. Papaulis, Systems and Transforms with application in Optics, pp. 30-35, 1986.

"A New Sense For Depth of Field", by A. Pentland, Proceedings of Int. Joint Conference on Artificial Intelligence, pp. 988-994, Aug. 1985.

"Multiframe Image Point Matching and 3-D Surface Reconstruction" by R. Tsai, IEEE Transaction on Pattern Analysis and Machine Intelligence, vol. PAMI, No. 2, pp. 159-174, Mar. 1983.

"A Perspective on Range Finding Techniques For Computer Vision", by R. Jarvis, IEEE Transactions on Pattern Analysis and Machine Intelligence, vol. PAMI-5, No. 2, pp. 122-139, Mar. 1983.

"Restoration", by A. Kak, Digital Picture Processing, vol. 1, pp. 268-347, 1982.

"Measuring Curved Surfaces for Robot Vision", by E. Hall, et al. Computer by The Computer, Society of IEEE, pp. 42-53, Dec. 1982.

FIG. 1

| | | |
|---|---|---|
| P: OBJECT POINT | O.A.: OPTICAL AXIS | ID: IMAGE DETECTOR |
| LF: LIGHT FILTER | P1: FIRST PRINCIPAL PLANE | S, f, D : CAMERA PARAMETERS |
| As: APERTURE STOP | P2: SECOND PRINCIPAL PLANE | V: DIST OF IMAGE FOCUS |
| L1: FIRST LENS | Q1: FIRST PRINCIPAL POINT | p': FOCUSED IMAGE |
| L2: SECOND LENS | Q2: SECOND PRINCIPAL POINT | P: BLURRED IMAGE |
| | OS: OPTICAL SYSTEM | |

AUTOMATIC RANGING AND AUTOMATIC FOCUSING

FIELD OF INVENTION

The present invention relates to a method for automatic ranging (i.e. determining distance) of objects and autofocusing of camera systems. The method is based on processing defocused images of objects using signal processing techniques. The method is passive in the sense that it does not involve sending out infrared, sonar, laser, or other type of beams towards the objects, but it uses only ambient illumination.

PRIOR ART

Finding the distance of objects from a camera system has applications in the fields of robotic vision, autonomous vehicle navigation, and rapid autofocusing of camera systems. Many methods are known for determining the distance of objects from a camera system. The methods relevant to this invention are those based on using image defocus information for determining distance.

A common technique based on image defocus for finding the distance of an object from a camera involves focusing the object's image on the image detector in the camera. The distance is then determined from the camera setting. This technique is called depth-from-focusing. A comparative study of different depth-from-focusing methods is reported by E. Krotkov in an article titled "Focusing" in the October 1987 issue of *International Journal of Computer Vision*, Volume 1, No. 3, pages 223-238.

The depth-from-focusing technique involves (i) acquiring a large number (about 20 or more) of images for different camera settings, (ii) computing a focus measure for each of these images, and, (iii) determining the image for which the focus measure is a maximum and determining distance from the corresponding camera setting. The major drawbacks of this technique are (i) it is very slow because it involves acquiring many images for different camera settings, and (ii) it requires large computational resources in terms of computer memory space and processing power.

A new method of finding distance of objects is described by A. P. Pentland in a paper titled "A New Sense for Depth of Field" published in July 1987 in *EEEE Transactions on Pattern Analysis and Machine Intelligence*, Vol. PAMI-9, No. 4, pages 523-531. This method is based on comparing two images, one image formed with a very small (pin-hole) aperture and the other image formed with a normal aperture. Application of this method poses some serious practical difficulties. A very small aperture increases the effects of diffraction which distorts the image. Further, a smaller aperture gathers lesser light and therefore increases exposure period. These problems make the method inaccurate, slow, and of limited use in practical applications. More importantly, this method is restricted to only those camera systems with a Gaussian Modulation Transfer Function (MTF) and it involves the computation of two-dimensional Fourier transforms. In comparison, the present invention is not restricted to Gaussian MTFs, and it is based on the more efficient one-dimensional Fourier transforms.

In addition to determining the distance of objects, the present invention advances technology for rapid autofocusing of electronic cameras. Several methods of auto-focusing of cameras are known. One method for autofocusing has been disclosed in Japanese Patent No. 62284314 dated 1987 and granted to FUJI. This method is very restricted in scope since it involves changing only one camera parameter—the position of the lens whereas, in the present invention, up to three camera parameters may be varied. Further, the Japanese '314 disclosure involves the use of at least three pictures whereas the present invention uses only two pictures. Also, while the Japanese '314 disclosure involves the use of only high spatial frequencies, the present invention involves the use of low spatial frequencies. Most importantly, this method uses a two-dimensional Fourier transform which is computationally expensive whereas the present invention uses a one-dimensional Fourier transform which is computationally efficient.

Another autofocusing method titled "Focal Point Detector" has been disclosed by Takeshi Baba, et al. in Japanese Patent No. 63-127217 laid open on May 31, 1988 and awarded to CANNON. The Japanese '217 disclosure suffers from the same drawbacks as set forth above with regard to the Japanese '314 disclosure, and is applicable only when the Modulation Transfer Function (MTF) is a Gaussian function. The Gaussian is a very crude approximation to the actual MTF of the camera system. Therefore, the method of '217 Japanese disclosure is also subject to error.

A previous method and apparatus for finding the distance of objects and autofocusing has been disclosed by the inventor of the present invention in commonly-owned U.S. Pat. No. 4,965,840 issued on Oct. 23, 1990. This previous method is restricted to camera systems whose Modulation Transfer Functions can be characterized by a single parameter. More importantly, it involved the computation of two-dimensional Fourier transforms which is computationally expensive.

Yet another method of determining distance and rapid autofocusing has been disclosed by the inventor of the present invention in another commonly owned co-pending U.S. patent application Ser. No. 07/551,933, filed on Jul. 12, 1990. However, that method is based on a spatial domain approach whereas the present invention is based on a Fourier domain approach. The two inventions are therefore entirely different and hence are not comparable. However, the present invention is more robust against noise and therefore more useful in practical applications.

Another method of automatic ranging and autofocusing are disclosed by the inventor of the present invention in commonly-owned pending U.S. patent application Ser. No. 07/373,996 filed on Jun. 29, 1989. Unlike the first invention, this latter invention was not limited to cameras having specific types of point spread functions or modulation transfer functions. A prototype camera system was built by this inventor in the Computer Vision Laboratory, Department of Electrical Engineering, State University of New York at Stony Brook. On this prototype, this latter invention was implemented. But the performance of the prototype was unsatisfactory. It was found to be inaccurate and inefficient. The inaccuracy was due to two reasons: (i) substantial and systematic noise generated by the camera system in the recorded images, and (ii) border effects (or the "image overlap problem"). The inefficiency was due to the computation of two-dimensional Fourier coefficients.

The inaccuracy problem can be overcome by (i) reducing noise by using a high quality camera with low noise, and (ii) reducing the border effects by using a high resolution camera and multyplying the images by a weighting function. Both these solutions increase the cost of the camera apparatus substantially. The inefficiency problem can be addressed by using fast computational hardware, but this also would increase the cost of the apparatus substantially.

The present invention is accurate, efficient, and less expensive in comparison with the above invention. The present invention has been successfully implemented on a camera prototype and tested.

SUMMARY OF THE INVENTION

It is an object of the present invention to substantially eliminate the problems inherent in prior art while retaining all the advantages in prior art.

The essential object of the present invention is a method and apparatus for automatic ranging and automatic focusing of a camera system.

Another essential object of the present invention is an apparatus for automatic ranging and automatic focusing which is substantially cheaper than the apparatuses of prior art.

Another object of the present invention is a method for automatic ranging and focusing which is robust even in the presence of both random noise and systematic apparatus noise.

Another object of the present invention is a method and apparatus for automatic ranging and focusing which gives accurate results by reducing border effects in images (or the "image overlap problem" explained later).

Yet another object of the present invention is a method and apparatus for automatic ranging and focusing which is computationally efficient and therefore requires minimal computational circuitry.

A primary object of the present invention is a method and apparatus for automatic ranging and focusing which does not involve the computation of two-dimensional Fourier coefficients, but involves the computation of only one-dimensional Fourier coefficients.

A yet further object of the present invention is a method and apparatus for automatic ranging and focusing which does not involve the use of a two-dimensional CCD image sensor, but involves the use of only a one-dimensional (or a linear) CCD image sensor, thus reducing cost of the apparatus.

Other and further objects will be explained hereinafter, and will be more particularly deliniated in the appended claims, and other objects of the present invention will become evident hereinafter to those with ordinary skill in the art to which the present invention pertains.

A summary of the method of the invention is presented next.

The present invention is a method of determining the distance (or ranging) of an object from a camera system. The camera system used in the method includes an aperture through which light enters, a light filter which controls the spectral content of light entering the camera system, and an image detector for sensing images of objects formed inside the camera system. An image processor is operatively connected to the image detector through an image acquisition device. The camera system includes an optical system having a first principal plane and a second principal plane, where the second principal plane is arranged closer to the image detector than the first principal plane.

The camera system is characterized by a Modulation Transfer Function (MTF) at a set of object distances $U=(u_1,u_2,\ldots,u_m)$ and a set of discrete frequencies $V=(\rho_1,\rho_2,\ldots,\rho_n)$. The MTF itself is determined by a set of camera parameters and the distance u of the object which is imaged by the camera system. The set of camera parameters includes at least one of (i) distance (s) between the second principal plane and the image detector, (ii) diameter (D) of the camera aperture, (iii) focal length (f) of the optical system in the camera system, and (iv) spectral characteristic ($\lambda$) of the light filter.

The camera system in the present invention is configurable to at least two distinct camera settings—a first camera setting corresponding to a first set of camera parameters $E_1=(\lambda_1,s_1,f_1,D_1)$ and a second camera setting corresponding to a second set of camera parameters $E_2=(\lambda_2,s_2,f_2,D_2)$. The second set of camera parameters must differ from the first set of camera parameters in at least one camera parameter value. They can differ in more than one (two, three, or all) camera parameter values.

The method of the present invention includes many steps. In the first step, a ratio table is calculated at the set of object distances U and the set of discrete frequencies V. The entries in the ratio table are obtained by calculating the ratio of the MTF values at the first camera setting to the MTF values at the second camera setting.

In the next step, a transformation named log-by-rho-squared transformation is applied to the ratio table to obtain a stored table $T_s$. The log-by-rho-squared transformation of a value in the ratio table at any frequency rho is calculated by first taking the natural logarithm of the value and then dividing by the square of rho.

In the next step, the camera is set to the first camera setting specified by the first set of camera parameters E1.

A first image $g_1$ of the object is formed on the image detector, and it is recorded in the image processor as a first digital image. The first digital image is then summed along a particular direction to obtain a first signal which is only one-dimensional as opposed to the first digital image which is two-dimensional. This step reduces the effect of noise significantly and also reduces subsequent computations significantly. It is to be particularly noted that this step is of great importance in the method of the present invention. This step has not been disclosed in any prior art.

Next, the first signal is normalized with respect to its mean value to provide a first normalized signal. Then, a first set of Fourier coefficients of the first normalized signal is calculated at the set of discrete frequencies V.

In the next step, the camera system is set to the second camera setting specified by the second set of camera parameters E2.

A second image $g_2$ of the object is formed on the image detector, and it is recorded in the image processor as a second digital image. The second digital image is then summed along the same particular direction in which the first digital image was summed earlier to obtain a second signal which is only one-dimensional as opposed to the second digital image which is two-dimensional. This step reduces the effect of noise significantly and also reduces subsequent computations significantly. It is to be particularly noted that this step is of great importance in the method of the present invention. This step has not been disclosed in any prior art.

Next, the second signal is normalized with respect to its mean value to provide a second normalized signal. Then, a second set of Fourier coefficients of the second normalized signal is calculated at the set of discrete frequencies V.

In the next step, the corresponding elements of the first set of Fourier coefficients and the second set of Fourier coefficients are divided to provide a set of ratio values. To this set of ratio values, the log-by-rho-squared transformation is applied to obtain a calculated table $T_c$. Here also, the log-by-rho-squared transformation of a ratio value at any frequency rho is calculated by first taking the natural logarithm of the ratio value and then dividing by the square of rho.

In the next step, the distance of the object is calculated on the basis of the calculated table $T_c$ and the stored table $T_s$. This completes the basic outline of the method of determining distance in the present invention.

In the method outlined above, as an optional step, the first digital image and the second digital image are multiplied by a center-weighted mask such as a two-dimensional Gaussian mask. This reduces the effect of the image overlap problem.

As another optional step, when the magnification of the first digital image and the second digital image are significantly different, then both of them are normalized with respect to magnification by scaling their sizes. This results in both the first and the second digital images to have the same magnification.

In another optional step, the region surrounding the border of the object of interest is kept dark by not illuminating that region. This results in avoiding the image-overlap problem and enhancing the accuracy of determining the distance of the object.

In yet another optional step, the object is illuminated by projecting a light pattern on to it. This provides a brightness variation for determining the distance of the object even though the object itself has uniform reflectance characteristics (e.g. a white wall).

In another optional step of the present invention, the first normalized signal and the second normalized signal are reflected at their edges to make them two times longer, whereby the effect of image overlap problem is diminished.

The method of the present invention is general and it is applicable to all types of MTFs. In particular, it is applicable to MTFs which are Gaussian functions, and it is also applicable to sinc-like MTFs which are determined according to paraxial geometric optics model of image formation.

In the method of the present invention, the stored table $T_s$ can be represented in one of several possible forms. In particular, it can be represented by a set of parameters. In particular, it may be represented by a set of three parameters corresponding to a quadratic function, or a set of two parameters corresponding to a linear function. In either of these two cases, the distance of the object is calculated by either computing the mean value of the calculated table $T_c$, or by calculating the mean-square error between the calculated table and the stored table.

In the method of the present invention, the first set of camera parameters and the second set of camera parameters differ in at least one camera parameter value. In particular, the method includes the case where the first and the second set of camera parameters differ in the value of the parameter s which specifies the distance of the image detector from the second principal plane.

The image detector in the camera system can be a CCD array. The summation of the first digital image and the second digital image can be carried out by rotating a mirror through an angle so as to sweep the first and second images across a linear CCD array.

The present invention includes a new method of automatically focusing the image of an object in a camera system. This method is very similar to the method of determining the distance of an object except for the last step. In the last step, instead of calculating distance, a set of focus camera parameters $E_f$ is calculated on the basis of the calculated table $T_c$ and the stored table $T_s$. After this step, the configuration of the camera system is adjusted to the camera setting specified by the set of focus camera parameters $E_f$. This accomplishes automatic focusing. Other than this, the optional steps and features applicable to the method of determining distance are also applicable to the method of automatic focusing.

ADVANTAGES

An important advantage of the present invention is that it does not involve the computation of two-dimensional Fourier coefficients whereas prior art does involve the computation of two-dimensional Fourier coefficients. The present invention involves the computation of only one-dimensional Fourier coefficients. Computation of two-dimensional Fourier coefficients is computationally very expensive in comparison with the computation of one-dimensional Fourier coefficients. Computation of two-dimensional Fourier coefficients is slow and requires expensive hardware. Therefore, the apparatus of the present invention is cheaper, simpler, and faster than the apparatus of prior art.

Another important advantage of the present invention is that it is much more robust against noise than prior art. This is accomplished by summing two-dimensional images along a particular direction to obtain one-dimensional signals which are then used for determining distance. The summation operation has the effect of cancelling most of the effect of all types of zero-mean noise.

The method of the present invention has been implemented on an actual camera system and it has been demonstrated to be better than the best and most general method known in prior art.

The present invention shares many important features of an earlier invention by this same inventor (U.S. patent application Ser. No. 07/373,996, filed on Jun. 29th, 1989, pending). For example, the present invention is not restricted by the form of the Modulation Transfer Function (MTF) of the camera. It is applicable to any camera system that can be modeled as a linear shift-invariant system (i.e. a systems that performs convolution). Therefore it is applicable even in the presence of significant optical aberrations and image distortion caused by diffraction. In particular, the present invention is applicable but not restricted to camera systems with Gaussian and sinc-like MTFs. In the present invention, the MTF is characterized completely in terms of the relevant camera parameters, thus accounting for diffraction effects and lens aberrations.

The present invention is also general and therefore many camera parameters can be changed simultaneously instead of changing only one camera parameter at a time. Further, it generalizes the method of determining distance to determining other camera parameters. It also generalizes the method to any linear shift-invariant system for estimating any number of system parameters and estimating the input signal.

Further advantages of the present invention will become apparent hereinafter to those with ordinary skill in the art to which the present invention pertains.

BRIEF DESCRIPTION OF THE DRAWINGS

For a further understanding of the objects of the present invention, reference is made to the following description of the preferred embodiment which is to be taken in connection with the accompanying drawings.

DETAILED DESCRIPTION OF THE PREFERRED EMBODIMENTS

Figure 1:
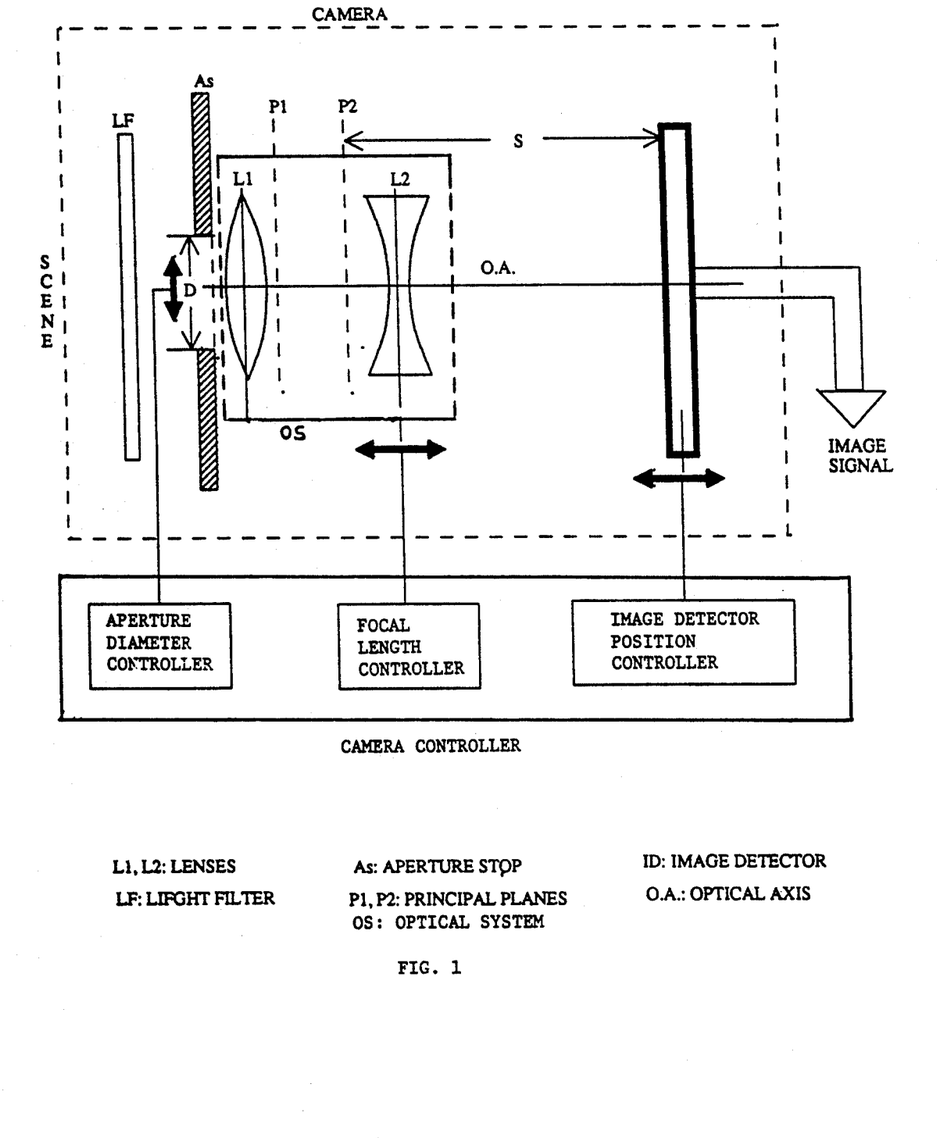
FIG. 1 is a block diagram of the camera system of the preferred embodiment. It illustrates a focal length controller, image detector position controller, a camera aperture diameter controller, and a filter to control the spectral content of light entering the camera.
Figure 2:
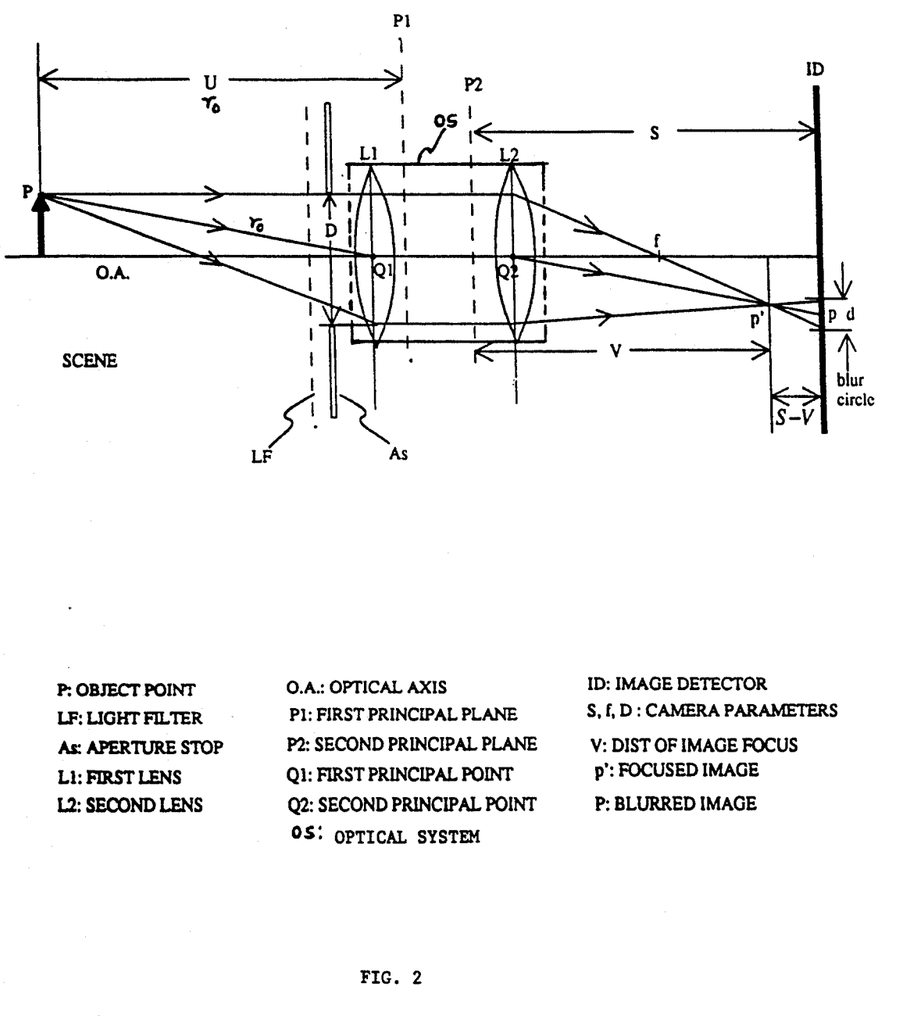
FIG. 2 illustrates the camera parameters and the image formation process in the preferred embodiment of the camera system.
Figure 5:
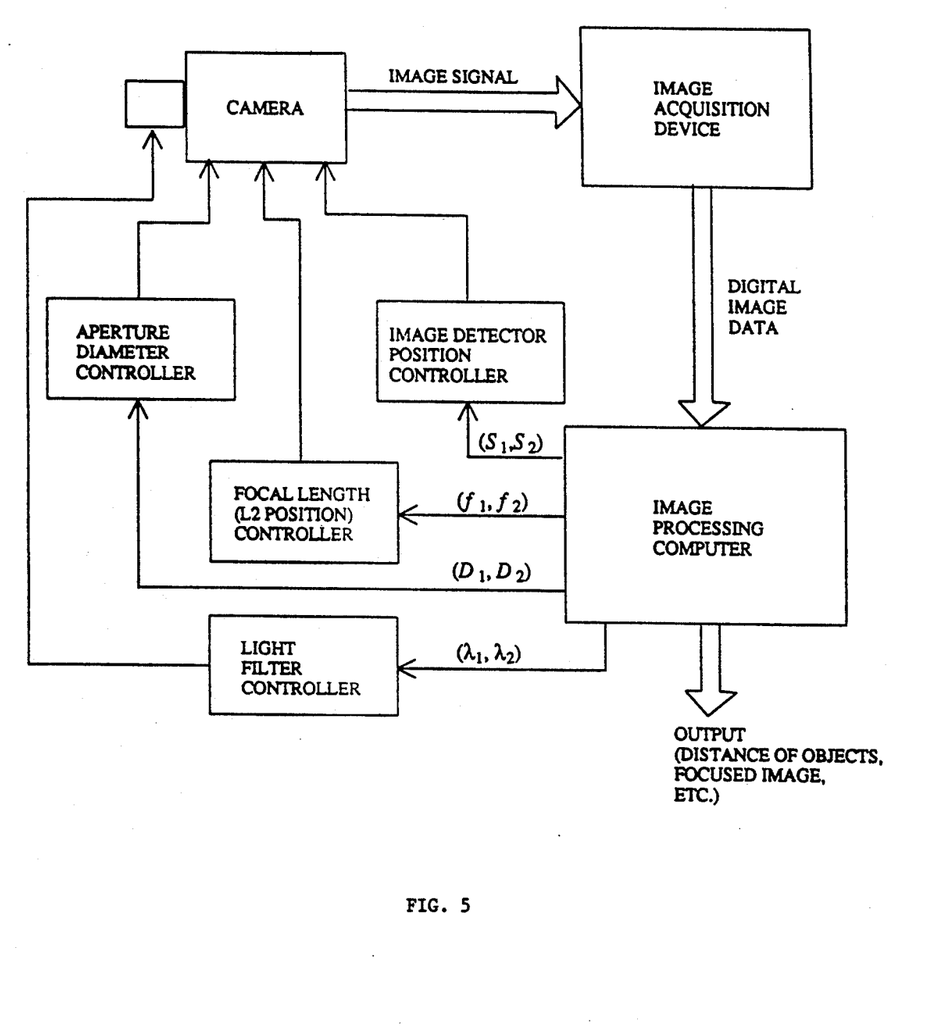
FIG. 5 shows an example where a digital image processing computer has been used in the implementation of the apparatus of the present invention.

The present invention will now be described with reference to the drawings. FIG. 1, FIG. 2, and FIG. 5 show the camera system of the preferred embodiment. It includes a light filter LF, an aperture stop AS, an optical system OS, and an image detector ID. The light filter LF controls the spectral content $\lambda$ of light entering the camera. For example, a red filter transmits only red light and blocks light of the other wavelengths. The amount of light entering the camera is controlled by the aperture stop AS. In the preferred embodiment, the aperture of the aperture stop is circular. Therefore, the amount of light is controlled by varying the diameter D of the aperture of the aperture stop. The aperture of the aperture stop is also referred to as the camera aperture. In the preferred embodiment, the optical system OS consists of lenses. The optical system is characterized by its focal length f, the first principal plane P1 and the second principal plane P2. The image detector ID is positioned at a distance s from the second principal plane P2. In this figure, OA is the optical axis of the camera system. An object OB is located at a distance u from the first principal plane P1. The optical system OS forms an image of the scene on the image detector ID. The image formed on the image detector ID is converted to an electronic video signal which forms the output of the camera system.

The camera is characterized by a set of camera parameters. The camera parameters are (see FIG. 2): (i) the distance s between the second principal plane P2 of the optical system and the image detector ID, (ii) the diameter D of the camera aperture, (iii) the focal length f of the optical system, and (iv) the spectral transmittance characteristic $\lambda$ of the light filter LF. The values of these camera parameters together specify the physical configuration or the camera setting of the camera system. In the preferred embodiment, at least one of these camera parameters is variable. In the preferred embodiment, s is changed by moving the whole optical system OS along the optical axis (or moving the image detector ID), f is changed by moving lens elements in the optical system relative to each other, D is changed by altering the diameter of aperture stop AS, and $\lambda$ is changed by changing the light filter LF.

The values of the camera parameters s, f, D, and $\lambda$ are respectively controlled by four controllers: image detector position controller, focal length controller, aperture controller, and light filter controller. These controllers can be used to set the values of the camera parameters s, f, D and $\lambda$ to desired values. The four controllers together constitute the camera controller.

Figure 3:
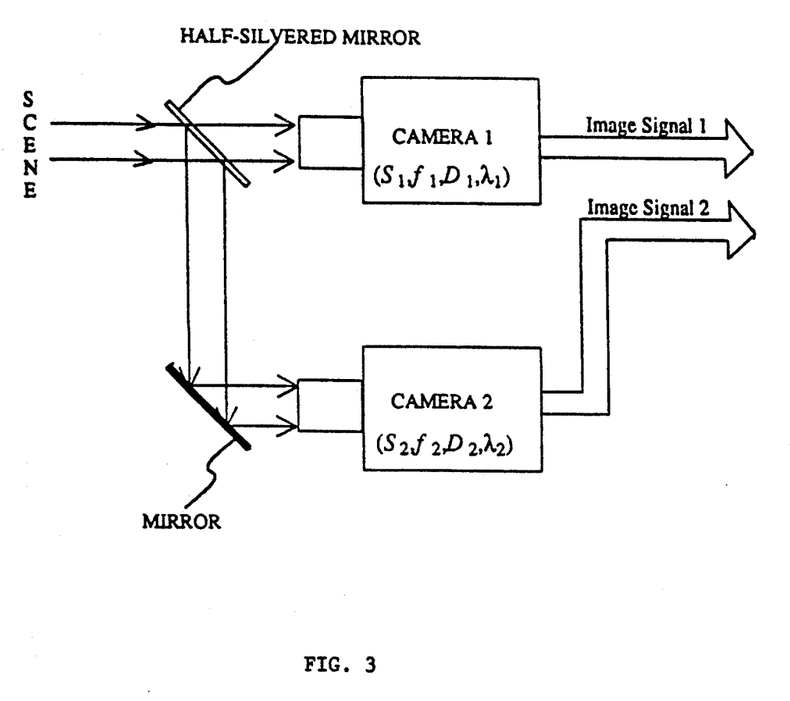
FIG. 3 is a block diagram of an alternative camera embodiment having two cameras (instead of one camera) with different camera parameter values and a beam-splitting arrangement for viewing a scene through a common aperture.

An alternative embodiment of the camera system is obtained by a minor modification of the preferred embodiment described above. In this modified embodiment, instead of using a single camera system which provides means for changing the camera parameters, multiple cameras are used. These multiple cameras are such that the camera parameter values of each individual camera differs in at least one of the camera parameters in comparison with all other cameras. That is, no two cameras among the multiple cameras have identical camera parameter values for all camera parameters. In this apparatus, there is no necessity to provide for varying any of the camera parameters of the individual cameras. All camera parameters of each camera can be fixed, thus avoiding the necessity for any moving parts in the camera system. Therefore the apparatus can be made rugged. Each camera is used in acquiring one image corresponding to one set of values of camera parameters. Each of the individual cameras view the scene through a common aperture with the aid of a beam-splitting arrangement. Except for the above differences, the alternative embodiment is similar to the preferred embodiment. FIG. 3 shows an example where two cameras with different camera parameter values view the scene through a beam-splitter consisting of a half-silvered mirror and a full mirror.

In the preferred embodiment of the present invention, the camera system is circularly symmetric about the optical axis OA. Therefore, the Modulation Transfer Function (MTF) of the camera is also circularly symmetric. If p represents the spatial frequency, then the MTF of the camera can be specified by $H(s,f,D,\lambda, u;p)$, or, in short, $H(E,u;p)$, where E is a vector whose components are the camera in short, $H(E,u;p)$, where E is a vector whose components are the camera parameters, i.e.

$$E = (s,f,D,\lambda) \qquad (1)$$

The camera system is characterized by the MTF at a set of object distances $$U = (u_1, u_2, \ldots, u_m) \quad (2)$$

and a set of discrete frequencies $$V = (\rho_1, \rho_2, \ldots, \rho_n). \quad (3)$$

This characterization is done for at least two different values of camera settings $E_1$ and $E_2$ where $$E_1 = (s_1, f_1, D_1, \lambda_1), \quad (4)$$

$$E_2 = (s_2, f_2, D_2, \lambda_2). \quad (5)$$

From here onwards, $E_1$ is referred to as the first camera setting, and $E_2$ is referred to as the second camera setting. In the preferred embodiment of the present invention, $\rho_i = 0.6 \cdot i$ for $i = 1, 2, ..., 6$, and $m = 20$. Typically, $\rho_i$ are taken to be low frequencies. If $u_{min}$ and $u_{max}$ are the minimum and maximum distances at which the object OB may be located, then the $u_i$s are calculated using the formula $$\frac{1}{u_i} = \frac{i}{m}\left(\frac{1}{u_{min}} - \frac{1}{u_{max}}\right). \quad (6)$$

In the preferred embodiment of the present invention, $u_{min} = 15f$ and $u_{max} = \infty$.

The MTF data for the two camera settings $E_1$ and $E_2$ are denoted by $H(E_1, u_i, \rho_j)$ and $H(E_2, u_i, \rho_j)$. In the first step of the method of the present invention, the ratio of these two MTFs are determined for $i = 1, 2, \ldots, m$ and $j = 1, 2, \ldots, n$ to obtain a ratio table $T_r(u_i, \rho_j)$. That is, the ratio table is obtained by calculating $$T_r(u_i, \rho_j) = \left(\frac{|H(E_1, u_i, \rho_j)|}{|H(E_2, u_i, \rho_j)|}\right). \quad (7)$$

A transformation called 'log-by-rho-squared' transformation is applied to this ratio table $T_r$ to obtain a stored table $T_s(u_i, \rho_j)$. (Here T stands for Table, and the subscript s stands for 'stored'.) The 'log-by-rho-squared' transformation of the ratio table is calculated by $$T_s(u_i, \rho_j) = \frac{1}{\rho_j^2} \log(T_r(u_i, \rho_j)). \quad (8)$$

Although the table $T_s(u_i, \rho_j)$ is stored at discrete values $u_i$ and $\rho_j$, interpolation technique is used to calculated the table value for intermediate values of $u$ and $\rho$. For intermediate values of $\rho$, due to the log-by-rho-squared transformation, a linear-interpolation scheme gives satisfactory results. For intermediate values of $u$, a linear or quadratic interpolation with respect to $1/u$ gives satisfactory results.

The table $T_s(u_i, \rho_j)$ may be stored as either raw data or in a parametric form. The parameters of the table are obtained by fitting a surface to the data and storing the parameters of the equation of the surface. In particular, it is usually found that $T_s$ is almost a constant with respect to $\rho$, and is quadratic with respect to $1/u$. Therefore, it can be parameterized as $$T_s(u_i, \rho_j) = a(1/u)^2 + b(1/u) + c \quad (9)$$

and the parameters a, b and c can be estimated from data using a least-squares fit approach. As a further simplification, if the diameter D of the camera aperture is not changed in the two camera settings $E_1$ and $E_2$, then it can be shown that the parameter a above is usually zero, and therefore, the table $T_s$ is linear with respect to $1/u$. In this case, only two parameters- b and c are adequate to represent the table $T_s$.

The stored table $T_s$ can also be compactly stored by first applying the log-by-rho-squared transformation to the MTF, fitting a surface to the result, and then storing the parameters of the surface.

In general, the amount of data in the stored table $T_s$ can be compactly represented by storing only the mean value of the table with respect to $\rho$, and if possible, parameterizing the result and storing only the parameters.

The focused image of the object OB is denoted by $f(x, y)$ and its Fourier transform by $F(\omega, \nu)$.

Figure 4:
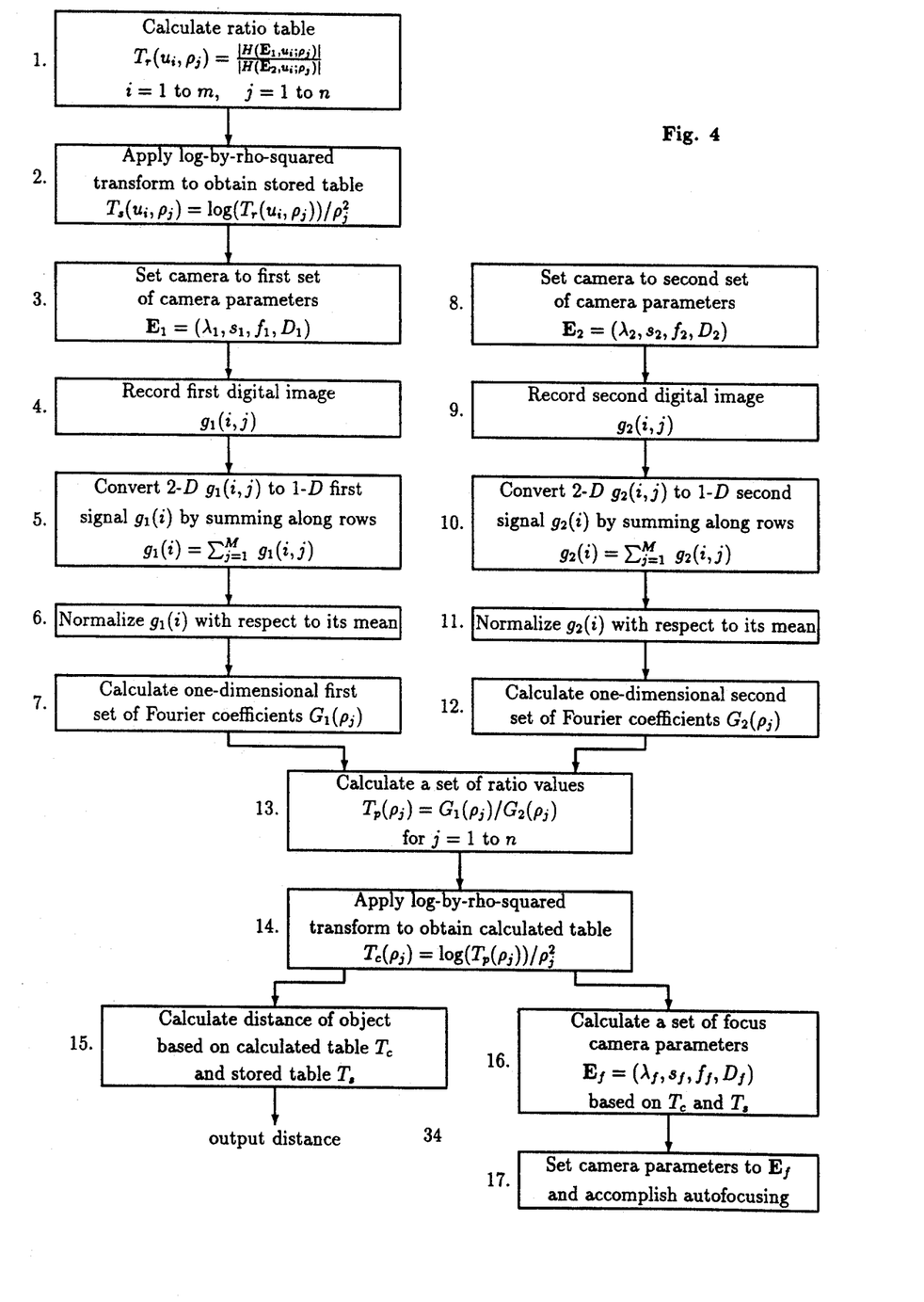
FIG. 4 is a flow-chart showing the main steps in the method of the present invention.

Referring to FIG. 4, the next step in the method of the present invention is to set the camera to a first camera setting $E_1$. This is accomplished by driving the camera controller. A first image $g_1$ of the desired object OB is then formed on the image detector ID. In the preferred embodiment, the image detector ID is a two-dimensional CCD image sensor array. The actual image of object OB recorded by the image detector ID is denoted by $g_1(i, j)$. If $g_1(i, j)$ contains images of other objects in addition to object OB, then it is windowed or clipped so that it contains the image of only object OB. If, however, the image $g_1$ is blurred, then the values of $g_1(i, j)$ at its border is affected by the images of other objects just outside the border. This is called the image overlap problem.

The first image $g_1$ is digitized and stored in a storage means. In the preferred embodiment of the present invention, the image $g_1$ is taken as a rectangular shaped image with N rows and M columns.

As an optional step, the effect of the image overlap problem is reduced by dempahsizing the border portions of $g_1(i,j)$. This is done by multiplying $g_1(i,j)$ by a center-weighted mask $w(i,j)$, such as a Gaussian mask defined by $$w(i,j) = e^{-\left(\frac{(i-N/2)^2}{2(N/c)^2} + \frac{(j-M/2)^2}{2(M/c)^2}\right)} \quad (10)$$

where c is a constant which is typically equal to 3. Alternatively, a light filter with Gaussian transmittance characteristic corresponding to $w(i,j)$ can be interposed between the optical system OS and the image detector ID to achieve the same effect by optical means.

The effect of the image overlap problem can be also reduced by blurring (or low pass filtering) the border portions of $g_1(i,j)$.

In an important departure from prior art, the two-dimensional (2D) first image $g_1(i,j)$ is converted to a one-dimensional first signal $g_1(i,j)$ by summing $g_1(i,j)$ along a particular direction. The actual direction of summation can be any direction, but in the preferred embodiment of the present invention, this direction is chosed to be the direction of rows in the digital image $g_1$. Therefore, if the image $g_1(i,j)$ has N rows and M columns, then this summation operation is carried out using the formula $$g_1(i) = \sum_{j=1}^{M} g_1(i,j) \text{ for } i = 1,2,\ldots,N. \tag{11}$$

This step reduces the effect of noise, especially zero-sum noise irrespective of whether the noise is random or systematic, in the image $g_1(i,j)$ because of the summation along one of the dimensions. This step also significantly reduces further computational effort in the subsequent steps.

The one-dimensional first signal $g_1(i)$ is normalized with respect to brightness by dividing it by its mean value. Then, as an optional step, the resulting signal is normalized to a standard (say unit) magnification by scaling.

As an optional step, the effect of the image overlap problem can be further reduced. In this step, the first signal $g_1$ is "reflected" at one of its' border to obtain a new first signal by replicating the signal to obtain a new first signal which is twice as long as the original first signal. The resulting new first signal is therefore symmetric with respect to the border point along which the original first signal is reflected. For example, if the reflection is done at the end (i.e. $i=N$), then the new first signal is the same as the first signal $g_1(i)$ for $i=1,2,\ldots,N$ and it is equal to $g_1(2N-i+1)$ for $i=N+1,N+2,\ldots,2N$. For convenience, the new first signal obtained by reflection is also denoted by $g_1$. In comparison with prior art, this optional step is an important improvement which reduces the image overlap problem. This step is motivated from the peculiar periodicity properties of the Discrete Fourier Transform.

The magnitudes of the one-dimensional Discrete Fourier Transform coefficients of $g_1(i)$ are calculated for the spatial frequencies corresponding to $\rho_1,\rho_2,\rho_3,\ldots,\rho_n$. These Fourier coefficients are denoted by $G_1(\rho_j)$ and together they are referred to as the first set of Fourier coefficients. From this first set of Fourier coefficients, any coefficient whose magnitude is smaller than a prespecified threshold is removed. Thus, Fourier coefficients with small magnitudes are excluded from usage in subsequent calculations. This is necessary to prevent large errors caused by noise.

The first set of Fourier coefficients are related to the corresponding Fourier coefficients of the focused image through the MTF as $$G_1(\rho_j) = H(E_1, u_k;\rho_j) F(\rho_j) \tag{12}$$

where $u_k$ is the distance u of the desired object OB.

Referring to FIG. 4, the next step is to set the camera to the second camera setting $E_2$. As before, this is accomplished by driving the camera controller. Then a second image $g_2(i,j)$ of the desired object OB is formed on the image detector ID and it is then recorded. Now this second image $g_2(i,j)$ is processed in a manner very similar to the first image $g_1(i,j)$ as described above (see steps 10, 11, and 12 in FIG. 4). All steps described until the previous paragraph are carried out on the second image. In particular, steps 3 to 7 in FIG. 4 correspond respectively to steps steps 8 to 12. This is clear from FIG. 4

After these steps, the Fourier coefficients $G_2(\rho_j)$ are related to the corresponding Fourier coefficients of the focused image through the MTF as $$G_2(\rho_j) = H(E_2, u_k;\rho_j) F(\rho_j) \tag{13}$$

where $u_k$ is the distance u of the desired object OB.

In the next step, the Fourier coefficients $G_1(\rho_j)$ of the first image are divided by the Fourier coefficients $G_2(\rho_j)$ of the second image to obtain a ratio set $T_p(\rho_j)$ for $j=1,2,\ldots,n$. That is, the ratio set $T_p(\rho_j)$ for $j=1,2,\ldots,n$ is calculated using the the formula $$T_p(\rho_j) = \frac{|G_1(\rho_j)|}{|G_2(\rho_j)|} \tag{14}$$

The calculated values of the ratio set $T_p$ do not depend on the appearance of the object OB. This is because, when $G_1$ as specified by Eq. (12) is divided by $G_2$ specified by Eq. (13), the focused image term $F(\rho_j)$ cancels out, and we get $$\frac{G_1(\rho_j)}{G_2(\rho_j)} = \frac{H(E_1, u_k;\rho_j)}{H(E_2, u_k;\rho_j)}. \tag{15}$$

In the above equation, the distance $u_k$ is the only unknown. Therefore, it can be solved to obtain the distance $u_k$ of the object. This is the basic principle underlying the method of the present invention. Note that, the right hand side in the above equation corresponds to the ratio table $T_r$ calculated earlier from the MTFs of the camera system.

In comparison with prior art, the above relation is for one-dimensional Fourier coefficients and not for two-dimensional Fourier coefficients. Therefore, the calculation of the Fourier coefficients is easier. Also, the above relation is independent of the actual shape of the MTF. This means that, the method is applicable to both specific MTFs such as Gaussian and sinc-like functions and also to general MTFs which are circularly symmetric. In fact, even the requirement of circular symmetry of the MTF is removed if the cross section of the MTF H corresponds to the direction of one-dimensional summation of $g_1(i,j)$ and $g_2(i,j)$. Therefore, the method of the present invention covers all physically possible MTF shapes, without restriction of symmetry or shape.

Next, the previously mentioned log-by-rho-squared transformation is applied to the ratio set $T_p$ computed above. The resulting values are stored in a calculated table $T_c(\rho_j)$ (here T stands for 'table', and the subscript c stands for 'computed' or 'calculated'). The formula for this calculation is $$T_c(\rho_j) = \frac{1}{\rho_j^2} \log(T_p(\rho_j)). \tag{16}$$

In the next step, the distance u of the object OB is calculated on the basis of the calculated table $T_c$ and the stored table $T_s$. The distance u is calculated by searching the stored table $T_s$ along the $u_i$ dimension to find a particular value of $u_i=u_k$ where $T_s(u_k;\rho_j)$ most closely resembles the calculated table values $T_c(\rho_j)$ for all $\rho_j$. If the table $T_s$ is represented as raw data, then one of the two methods below is used to calculate the distance u: (i) using mean-square error and (ii) mean.

In the first method using the mean-square error, a measure of closeness between $T_c$ and $T_s$ is calculated as $$e(u_i) = \sum_{j=1}^{n} [T_s(u_i;\rho_j) - T_c(\rho_j)]^2. \tag{17}$$

Here, the smaller the value of $e(u_i)$, the "closer" is the calculated table $T_c(p_j)$. Then find $u_k$ for which e is a minimum, i.e. $e(u_k) \leq e(u_i)$ for all $u_i$.

$u_k$ then is the distance or range of the desired object OB. This is displayed as output of the ranging system.

In the second method using mean, the "closeness" $e(u_i)$ is defined differently as $$e(u_i) = \left| \frac{1}{n} \sum_{j=1}^{n} T_s(u_i, p_j) - \frac{1}{n} \sum_{j=1}^{n} T_c(p_j) \right|. \quad (18)$$

The distance is then determined similar to the mean-square error method. It is the distance $u_k$ such that $e(u_k) \leq e(u_i)$ for all $u_i$.

If the table $T_s$ is represented using the parameters a, b, and c (only b and c when the diameter D is not changed, i.e. $D_1 = D_2$) as in Eq. (9), then the following method is used for determining distance. Calculate the mean value of the table $T_c$ defined by $$\mu = \frac{1}{n} \sum_{j=1}^{n} T_c(p_j). \quad (19)$$

Now solve the equation $$\mu = a(1/u)^2 + b(1/u) + c \quad (20)$$

to obtain u. In general, two solutions will be obtained for u. A case of particular interest is when the diameter D is not changed in the two camera settings, and therefore $a = 0$ in the above equation. In this case a unique solution is obtained for distance u as $u = b/(\mu - c)$.

If a set of two solutions is obtained for distance using the two images $g_1$ and $g_2$, then the resulting two-fold ambiguity is resolved by using a third image $g_3$ recorded with a third camera setting $E_3$. Just as the two images $g_1$ and $g_2$ were used to obtain one set of two solutions for distance, the images $g_2$ and $g_3$ are used in a similar manner and a second set of solutions is obtained for distance. The solution that is common to the two sets of solutions is taken as the actual distance of the object.

In principle, acquiring and processing just three images of an object are sufficient to determine the distance of the object. However, a more robust estimate of the distance can be obtained by processing several distinct triplets of images of the object. Each distinct triplet of images is processed to obtain one independent estimate of distance. A weighted average of all the independent estimates of distances yields a robust estimate of distance. In general, the distance of the object estimated by the above described method can be combined with other independent distance estimates (obtained by either the same method or a different method) by taking a weighted average to obtain a more robust estimate of the distance.

Figure 6:
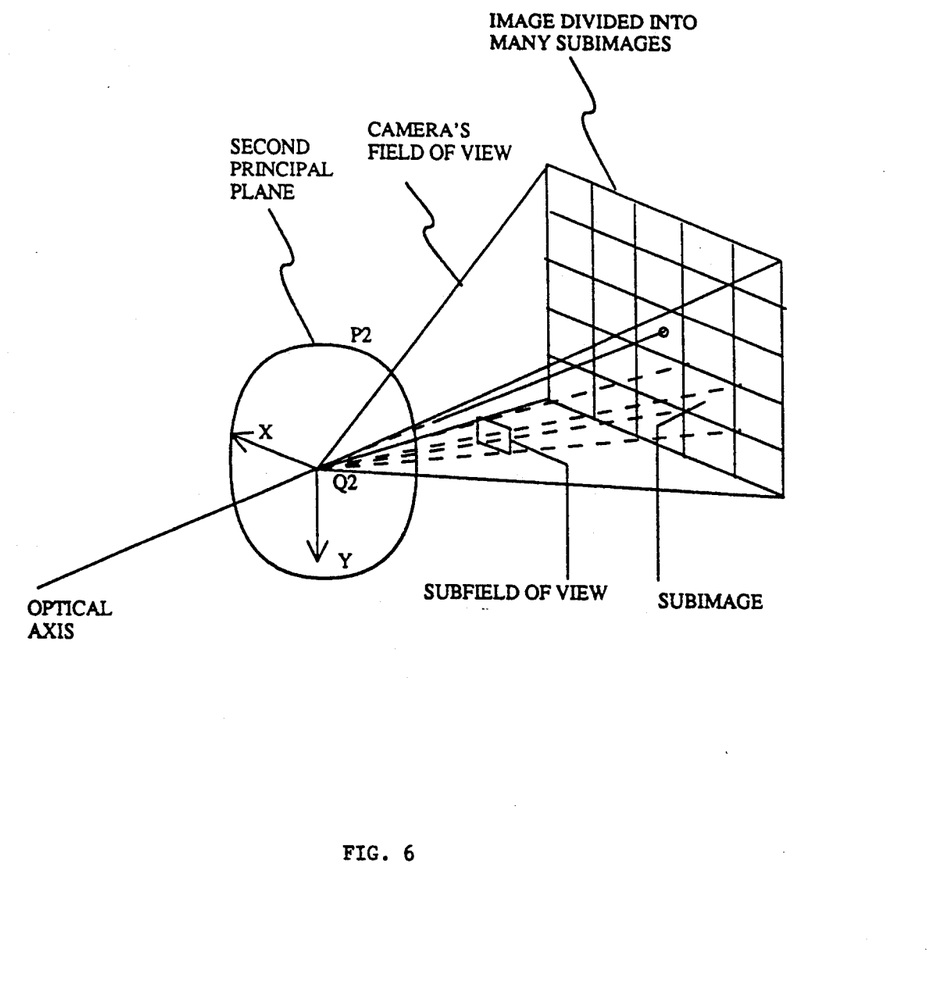
FIG. 6 shows the camera's field-of-view divided into many smaller subfield-of-views and the corresponding subimages into which the image has been divided.

The above method of determining the distance of an object from a camera can be applied to all objects in the field-of-view of the camera simultaneously to obtain the distance of all objects in the field-of-view. For example, the field-of-view of the camera can be divided into many smaller subfield-of-views and in each subfield-of-view the distance of the object in that subfield-of-view can be determined. Dividing the camera's field-of-view into many subfield-of-views corresponds to dividing the image formed on the image detector into many smaller subimages where each subimage corresponds to one subfield-of-view. FIG. 6 illustrates this concept. Each subimage can be processed in parallel with other subimages to determine the distance of the object in the corresponding subfield-of-view. Thus, the distance of all objects in the field-of-view of a camera can be determined simultaneously from only three images. This method has important applications in robotic vision where it is required to find the position of all objects in a scene very fast with minimal computation. An array of numbers representing the distance (or depth) of object points in a scene in small subfields-of-view of a camera is called the depth-map of the scene. Therefore, the method of the present invention is useful in obtaining the depth-map of a scene in an efficient manner.

In the above method of determining distance, the images $g_1(i,j)$ and $g_2(i,j)$ were summed with respect to j to obtain the one-dimensional signals $g_1(i)$ and $g_2(i)$ respectively. Instead, $g_1(i,j)$ and $g_2(i,j)$ can be summed with respect to i and then the distance $u_k$ can be found from the resulting one-dimensional signals. More importantly, the distance can be estimated in both ways, first by summing with respect to j, and then again by summing with respect to i. The average, or some other combination, of these estimates can be taken as the actual estimate of distance of the object. This makes the method immune against failure in the presence of bar-like patterns that are only vertical or only horizontal.

The present invention includes a new method autofocusing. This method is very similar to the method of determining the distance of an object described above. It is only in the last step that the two methods differ somewhat. In the last step of the method of determining distance, the distance is calculated on the basis of the stored table $T_s$ and the calculated table $T_c$. In the method of autofocusing, instead of calculating distance, a set of focus camera parameters specified by $E_f$ is calculated on the basis of the stored table $T_s$ and the calculated table $T_c$ where $$E_f = (s_f, f_f, D_f, \lambda_f). \quad (21)$$

All the steps until the calculation of the stored table $T_s$ and the calculated table $T_c$ are exactly the same in both the method of determining distance and the method of autofocusing. These steps therefore will not be described a second time here.

For every distance $u_i$ of the object OB, a desired camera setting $E_{fi}$ which focuses the object is specified by a relation called Distance-Camera-Setting-Relation (DCSR). On the basis of the calculated table $T_c$ and the stored table $T_s$, the set of focus camera parameters $E_f$ is calculated using DCSR. DCSR is specified either in a tabular form or in equational form.

After determining the set of focus camera parameters $E_f$, control signals are sent to the camera controller to set the camera to the desired setting E. This accomplishes autofocusing.

Figure 7:
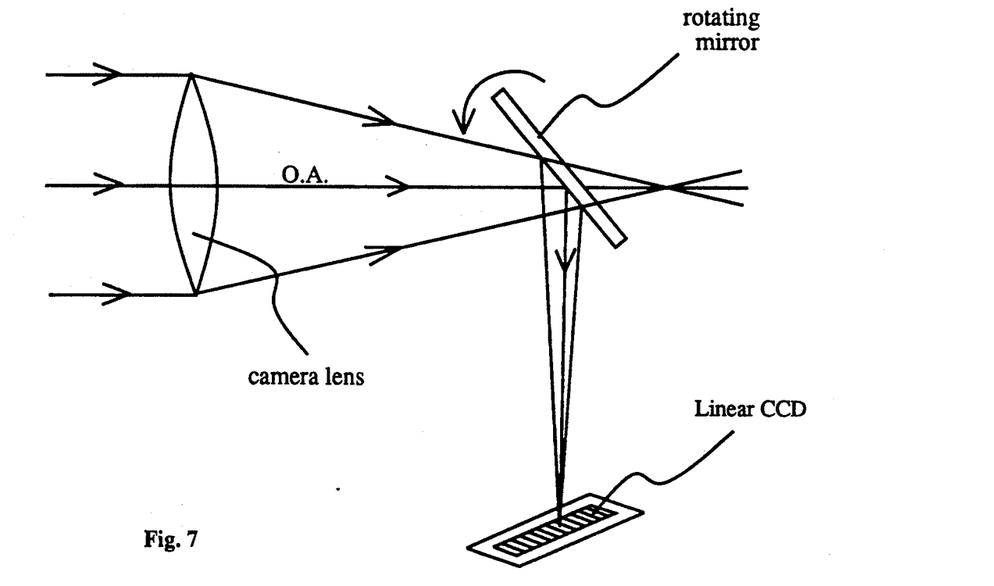
FIG. 7 shows a scheme for using a linear CCD array and a rotating mirror for image summation in one direction.
Figure 8:
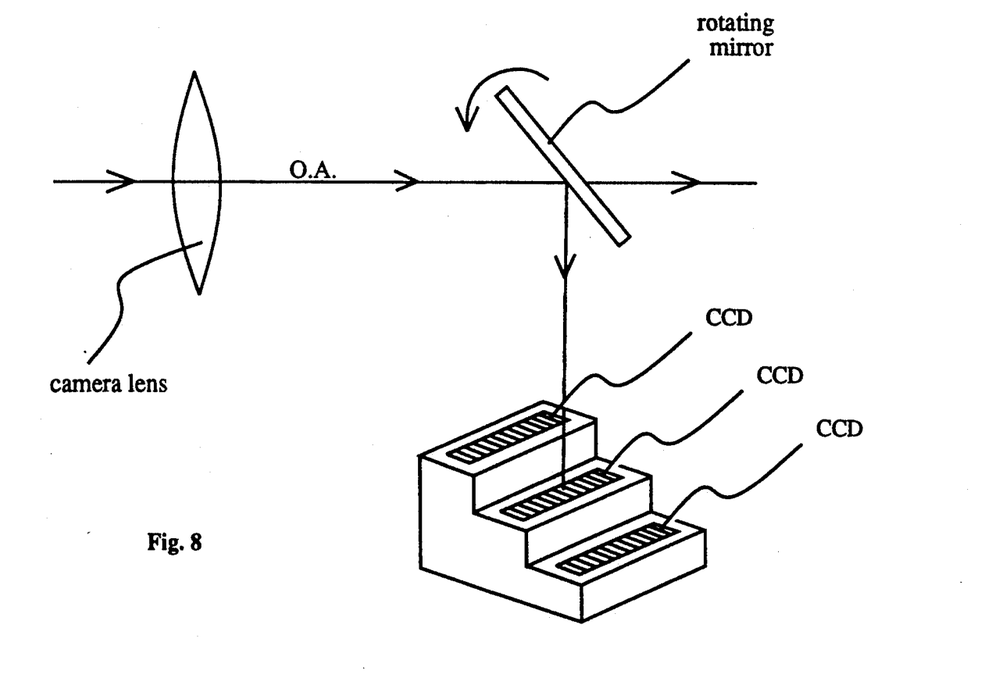
FIG. 8 shows multiple linear CCD arrays arranged in parallel for simultaneous sensing of images corresponding to different values of s.

In an alternative embodiment of the present invention a one-dimensional or linear CCD is used as the image detector. In this embodiment, a mirror is interposed along the optical path of the light rays of the object. The mirror reflects light rays of the object on to the linear CCD array. The mirror is then rotated by a small angle along an axis parallel to the linear CCD array (FIG. 7). This rotating or "sweeping" of the mirror causes the two-dimensional image of the object to be scanned by the linear CCD array. This scanning causes each array element to produce a response corresponding to summing the brightness of the image of the object along a direction prependicualr to the linear CCD array. This step has the effect of directly converting the two-dimensional image to a one-dimensional signal by optical means. The resulting one-dimensional signal is directly used in further calculations. In this embodiment, a cost savings is achieved since a one-dimensional CCD array is used instead of a two-dimensional CCD array. In this embodiment, the distance s between the second principal plane and the image detector can be varied in four ways: (i) by moving the lens system forward and backwards along the optical axis, (ii) by moving the linear CCD array up and down, (iii) by moving the mirror forward and backward along the optical axis, and (iv) by placing two or more linear CCDs in parallel at different distances from the mirror (FIG. 8).

Figure 9:
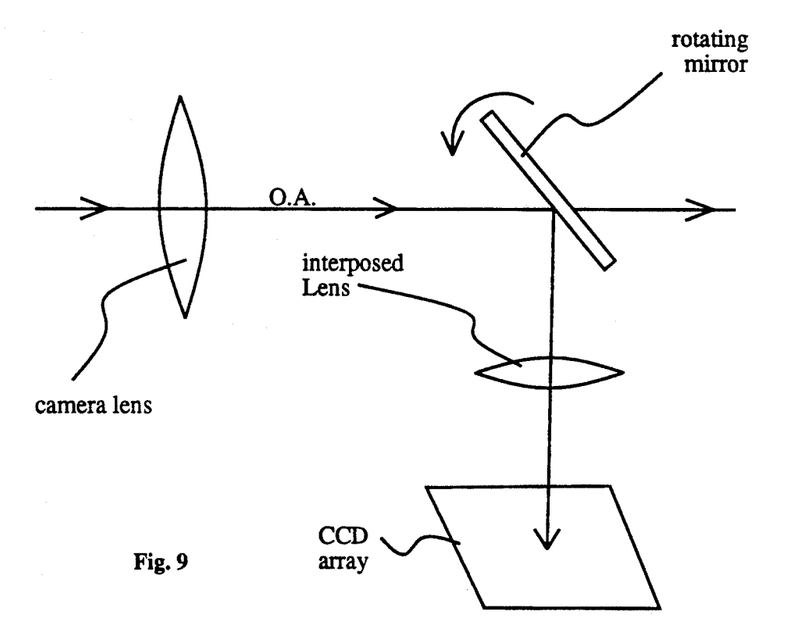
FIG. 9 shows how a lens can be interposed between a mirror and a CCD array for changing the focal length f.

In another embodiment of the present invention, a lens is interposed between the mirror and the image detector (FIG. 9). The focal length f is then varied by moving the lens up and down.

In yet another embodiment of the present invention, an aperture is interposed between the mirror and the image detector. The aperture diameter D is then varied by changing the diameter of this aperture.

CONCLUSIONS, RAMIFICATIONS, AND SCOPE OF INVENTION

The present invention shares many important features and generalities of an earlier invention by this same inventor (U.S. patent application Ser. No. 07/373,996, filed on Jun. 29th, 1989, pending). For example, the present invention can be generalized to obtain a method of determining camera parameters instead of distance of objects. It can also be generalized to derive a method of obtaining focused images from blurred images. It can be further generalized to any linear shift-invariant system for estimating any number of system parameters and estimating the input signal.

While the description of the method of the present invention contains many specificities, these should not be constructed as limitations on the scope of the invention, but rather as exemplifications of preferred embodiments thereof. Further modifications and extensions of the present invention herein disclosed will occur to persons skilled in the art to which the present invention pertains, and all such modifications are deemed to be within the scope and spirit of the present invention as defined by the appended claims and their legal eqivalents thereof.

I claim:

1. A method of determining the distance of an object from a camera system, said camera system having an aperture through which light enters, a light filter, an image detector, an image processor operatively connected to said image detector, an optical system having a first principal plane and a second principal plane, said second principal plane being arranged closer to said image detector than said first principal plane, said camera system characterizable by a Modulation Transfer Function (MTF) at a set of object distances and a set of discrete frequencies, said MTF determinable by a set of camera parameters and a distance of said object from the camera system, said set of camera parameters comprising at least one of (i) distance (s) between said second principal plane and said image detector, (ii) diameter (D) of said camera aperture, (iii) focal length (f) of said optical system, and (iv) spectral characteristic (λ) of said light filter, said camera system configurable to at least a first camera setting and a second camera settings the first camera setting corresponding to a first set of camera parameters and the second camera setting corresponding to a second set of camera parameters, the second set of camera parameters having at least one camera parameter value which is different from the values of said first set of camera parameters, said method comprising:

a) establishing a ratio table at said set of object distances and said set of discrete frequencies by determining the ratio of said MTF at said first camera setting to said MTF at said second camera setting;

b) transforming said ratio table through log-by-rho squared transformation to obtain a stored table;

c) setting said camera to said first set of camera parameters;

d) forming a first image of said object with said optical system on said image detector, and recording said first image in said image processor as a first digital image, said first digital image being a two dimensional signal;

e) summing said first digital image along a particular direction to obtain a first signal, said first signal being a one-dimensional signal, whereby the effect of noise is significantly reduced and subsequent computations are significantly reduced;

f) normalizing said first signal with respect to its mean value to provide a first normalized signal;

g) calculating a first set of Fourier coefficients of said first normalized signal at said set of discrete frequencies;

h) setting said camera system to said second set of camera parameters;

i) forming a second image of said object with said optical system on said image detector, and recording said second image in said image processor as a second digital image, said second digital image being a two-dimensional signal;

j) summing said second digital image along said particular direction to obtain a second signal, said second signal being a one-dimensional signal, whereby effect of noise is significantly reduced and subsequent computations are significantly reduced;

k) normalizing said second signal with respect to its means value to provide a second normalized signal;

l) calculating a second set of Fourier coefficients of said second normalized signal at said set of discrete frequencies;

m) dividing said first set of Fourier coefficients by said second set of Fourier coefficients to provide a set of ratio values;

n) transforming said set of ratio values through log-by-rho-squared transformation to obtain a calculated table; and o) calculating the distance of said object from said camera system on the basis of said calculated table and said stored table.

2. The method of claim 1 wherein said first digital image and said second digital image are multiplied by a center-weighted mark thereby reducing effect of image overlap.

3. The method of claim 1 where said first digital image and said second digital image are normalized with respect to magnification by sealing their sizes.

4. The method of claim 1 wherein a light pattern is projected onto said object to provide an illuminated object, whereby a brightness variation is provided for determination of said distance of said object from said camera system in the presence of uniform reflectance characteristics.

5. The method of claim 4 wherein said illuminated object has a border and a region surrounds said border, the region surrounding the border of said object not being illuminated, whereby image-overlap problem is avoided and accuracy of said distance of said object determination is enhanced.

6. the method of claim 1 wherein said first normalized signal and said second normalized signal are reflected at their edges to make them two times longer, whereby the effect of image overlap problem is diminished.

7. The method of claim 1 wherein said MTF is a Gaussian function.

8. the method of claim 1 wherein said MTF is sync-like and corresponds to paraxial geometric optics.

9. The method of claim 1 wherein said stored table is represented in said image processor by a set of two parameters corresponding to a linear function.

10. The method of claim 9 wherein step (o) is calculated by determining the mean value of said calculated table.

11. The method of claim 1 wherein said stored table is represented in said image processor by a set of three parameters corresponding to a quadratic function.

12. The method of claim 11 wherein step (o) is calculated by determining the mean value of said calculated table.

13. The method of claim 1 wherein step (o) is calculated by determining the mean-square error between said calculated table and said stored table.

14. The method of claim 1 wherein said first set of camera parameters and said second set of camera parameters differ in the values of the parameter s which specifies the distance of said image detector from said second principal plane.

15. The method of claim 1 wherein said image detector is a CCD array.

16. The method of claim 1 wherein the summing of step (e) and step (j) are performed by rotating a mirror through an angle so as to sweep said first and second images across a linear CCD array.

17. The method of automatically focusing a camera system to an object, said camera system having an aperture through which light enters, a light filter, an image detector, fan image processor operatively connected to said image detector, an optical system having a first principal plane and a second principal plane, said second principal plane being arranged closer to said image detector than said first principal plane, said camera system characterizable by a Modulation Transfer Function (MTF) at a set of object distances and a set of discrete frequencies, said MTF determinable by a set of camera parameters and a distance of said object, said set of camera parameters comprising at least one of (i) distance (s) between said second principal plane and said image detector, (ii) diameter (D) of said camera aperture, (iii) focal length (f) of said optical system, and (iv) spectral characteristic $\lambda$ of said light filter, said camera system configurable to at least a first camera setting and a second camera setting the first camera setting corresponding to a first set of camera parameters and the second camera setting corresponding to a second set of camera parameters, the second set of camera parameters having at least one camera parameter value which is different from the values of said first set of camera parameters, said method comprising:

a) calculating a ratio table at said set of object distances and said set of discrete frequencies by specifying the ratio of said MTF at said first camera setting to said MTF at said second camera setting;

b) transforming said ratio table through a log-by-rho-squared transformation to obtain a stored table;

c) setting said camera to said first set of camera parameters;

d) forming a first image of said object with said optical system on said image detector, and recording said first image in said image processor as a first digital image, said first digital image being a two dimensional signal;

e) summing said first digital image along a particular direction to obtain a first signal, said first signal being a one-dimensional signal, whereby the effect of noise is significantly reduced and subsequent computations are significantly reduced;

f0 normalizing said first signal with respect to its mean value to provide a first normalized signal;

g) calculating a first set of Fourier coefficients of said first normalized signal at said set of discrete frequencies;

h) setting said camera system to said second set of camera parameters;

i) forming a second image of said object with said optical system on said image detector, and recording said second image in said image processor as a second digital image, said second digital image being a two-dimensional signal;

j) summing said second digital image along said particular direction to obtain a second signal, said second signal being a one-dimensional signal, whereby the effect of noise is significantly reduced and subsequent computations are significantly reduced;

k) normalizing said second signal with respect to its mean value to provide a second normalized signal;

l) calculating a second set of Fourier coefficients of said second normalize signal at said set of discrete frequencies;

m) dividing said first set of Fourier coefficients by said second set of Fourier coefficients to provide a set of ratio values;

n) transforming said set of ratio values through log-by-rho-squared transformation to obtain a calculated table;

o) calculating a set of focus camera parameters corresponding to camera settings on the basis of said calculated table and said stored table; and p) adjusting the configuration of said camera system to the camera settings specified by said set of focus camera parameters, whereby automatic focusing is accomplished.

18. The method of claim 17 wherein said first digital image and said second digital image are multiplied by a center-weighted mask thereby reducing the effect of image overlap.

19. The method of claim 17 wherein said first digital image and said second digital image are normalized with respect to magnification by scaling their sizes.

20. The method of claim 17 wherein a light pattern is projected onto said object so as to provide an illuminated object, whereby a brightness variation is provided in order to determine the distance of said object from said camera system in the presence of uniform reflectance characteristics.

21. The method of claim 20 wherein said illuminated object has a border and a region surrounds said border, the region surrounding the border of said object not being illuminated, whereby the image-overlap problem is avoided and accuracy of said distance of said object determination is enhanced.

22. The method of claim 17 wherein said first normalized signal and said second normalized signal are reflected at their edges to make them two times longer, whereby the effect of image overlap problem is diminished.

23. The method of claim 17 wherein said MTF is a Gaussian function.

24. The method of claim 17 wherein said MTF is sync-like are corresponds to paraxial geometric optics.

25. The method of claim 17 wherein said stored table is represented in said image processor by a set of two parameters corresponding to a linear function.

26. The method of claim 25 wherein step (o) is calculated by determining the mean value of said calculated table.

27. The method of claim 17 wherein said stored table is represented in said image processor by a set of three parameters corresponding to a quadratic function.

28. The method of claim 27 wherein step (o) is calculated by determining the mean value of said calculated table.

29. The method of claim 17 wherein step (o) is calculated by determining the mean-square error between said calculated table and said stored table.

30. The method of claim 17 wherein said first set of camera parameters and said second set of camera parameters differ in the values of parameter s which specifies the distance of said image detector from said second principal plane.

31. The method of claim 17 wherein said image detector is a CCD array.

32. The method of claim 17 wherein the summing of step (e) and step (j) are performed by rotating a mirror through an angle so as to sweep said first and second images across a linear CCD array.

* * * * *